United States Patent [19]
Anderberg

[11] Patent Number: 5,078,340
[45] Date of Patent: Jan. 7, 1992

[54] SYSTEM FOR AUTOMATIC TRANSPORTATION OF AIRCRAFT ON THE GROUND

[75] Inventor: Nils-Eric Anderberg, Asbjer Gård, Sweden

[73] Assignee: FMC Trade International AB, Trelleborg, Sweden

[21] Appl. No.: 571,599

[22] PCT Filed: Feb. 23, 1989

[86] PCT No.: PCT/SE89/00074
§ 371 Date: Oct. 18, 1990
§ 102(e) Date: Oct. 18, 1990

[87] PCT Pub. No.: WO89/08051
PCT Pub. Date: Sep. 8, 1989

[30] Foreign Application Priority Data
Feb. 25, 1988 [SE] Sweden .................................. 8800688

[51] Int. Cl.⁵ .............................................. B64C 25/50
[52] U.S. Cl. ...................................................... 244/50
[58] Field of Search ..................... 180/168; 244/63, 50

[56] References Cited

U.S. PATENT DOCUMENTS

| | | | |
|---|---|---|---|
| 3,459,134 | 8/1969 | Shepheard | 244/50 |
| 4,121,788 | 10/1978 | McMahon | 244/50 |
| 4,842,220 | 6/1989 | Versteeg | 244/50 |

FOREIGN PATENT DOCUMENTS

| | | | |
|---|---|---|---|
| 1072104 | 12/1959 | Fed. Rep. of Germany | 244/50 |
| 1112905 | 8/1961 | Fed. Rep. of Germany | 244/114 R |
| 1266142 | 4/1968 | Fed. Rep. of Germany | 244/63 |
| 0319091 | 5/1965 | Sweden | 244/63 |

Primary Examiner—Joseph F. Peters, Jr.
Assistant Examiner—Linda L. Paloman
Attorney, Agent, or Firm—Dvorak and Traub

[57] ABSTRACT

A system for automatic transportation of an aircraft on the ground in the region of a parking place comprises in this region a carriage which is co-nectible to the nose wheel of the aircraft and is, by means of capstans, drivable back and forth along guide means in the ground.

4 Claims, 3 Drawing Sheets

SYSTEM FOR AUTOMATIC TRANSPORTATION OF AIRCRAFT ON THE GROUND

The present invention relates generally to a system for automatic transportation of heavy airliners on the ground. Especially when the aircraft cannot, for different reasons, use their own engines in areas where the operating space in limited, for example normally when the aircraft is to be backed out from its parking place (gate) adjacent an airport arrivals building, where the aircraft has been parked, inter alia, to let passengers leave and board etc.

The system which today is mainly used practically all over the world for transporting an aircraft, for example out of a parking place adjacent an arrivals building, means that one end of a steel tube is connected to a large and heavy tractor and the other end thereof to the nose wheel of the aircraft. Normally, two men are necessary of this operation. Then the tractor pulls th aircraft away from the parking place. This operation is usually called "push back". After the aircraft has been transported out of the parking place, the steel tube is disconnected from the aircraft, and then the aircraft can use its own engines to taxi further out of the gate area.

Among other systems used for transporting (backing) an aircraft out of its parking place after having been parked nose-in, three will be briefly described as follows:

1. The Power Back system. This means that the aircraft reverses its engines and leaves the parking place. It may be mentioned that there are a great number of aircraft which do not have sufficient reverse power to be capable of backing, and also a number of aircraft which cannot reverse their engines.

2. The Finnish system. It comprises a driving means which by great force is connected via rollers to one of the main landing gears of the aircraft and which, via the rollers, rotates the wheels of the aircraft, usually on the port-side, and then moves the aircraft away from the parking place.

3. The French sytem. It comprises a big tractor, one end of which is provided with a plate and a locking device. The plate is moved under the nose wheel of the aircraft, whereupon the nose wheel is locked to the plate. Subsequently, the tractor raises the nose wheel to go clear of the ground and transports the aircraft away from the parking place.

All prior art systems suffer from considerable drawbacks, inter alia since they cannot, without considerable expense, be automated and accurately position the aircraft. They also suffer from the following drawbacks:

A. The engine exhaust gases pollute the environment.

B. The environment is polluted in that the ground is de-iced by, inter alia, Orea (a fertiliser) to improve the friction surface for tractors.

C. As an alternative to using Orea, the area where the tractor is operating, is heated to improve friction, and for this large quantities of energy are required.

D. The Finnish system is said to give unfavourable asymmetric moments of load on the aircraft.

E. All prior art systems are labour-intensive.

F. None of the prior art systems can, in a reasonably short time, accurately park the aircraft at a passenger loading device, and therefore the passenger loading devices must be made larger to compensate for the variation in tolerance which is connected with today's systems.

G. There is a risk of collision between tractor and aircraft and other equipment in the airport.

H. All systems are capital-intensive in respect of initial expenses as well as operative and maintenance expenses.

I. In all prior art systems, check-blocks must be manually disposed at the wheels of the aircraft.

The primary object of the invention is to provide a system of the type indicated, which also satisfies all requirements for environmental aspects, reliability, flexibility, security, and accuracy and which is specifically adapted to all types of aircraft arriving at civil airports. The system serves to transport, with great accuracy, a passenger aircraft to a passenger loading device or some other equipment and then to firmly keep the aircraft in an exact parking position. The system also serves to transport the aircraft away from its parking position (gate) so as to provide for sufficient free operating space for the aircraft to taxi, by means of its own engines and with maximal reliability, away from the area of the arrivals building.

A further great advantage of the invention as compared to other prior art systems is that a minor assistance of ground personnel is required.

The operation of the system for e.g. start and stop is executed by wireless transmission of signals. The operation is carried out by, for example, the aircraft-man on the ground who, for security reasons, is always in contact with the pilots on board the aircraft and who surveys all transportations of the aircraft on the ground.

A further object of the invention is to design the system in such a way that it is applicable to all aircraft types known at present and also is readily adaptable to future types of aircraft. Further advantages of the system are obtained in that the aircraft is prevented from moving unintentionally. This significant advantage as to safety is obtained for the entire operative time during which the aircraft is operated by the system, i.e. even if under bad weather conditions, for example in case of ice and snow, the aircraft must pull up in front of an obstacle during transportation.

The system is preprogrammed so that it can move and park a heavy airliner with an accuracy down to one millimeter adjacent, for example, a passenger loading device or in the position outside the gate from which the aircraft is to taxi by means of its own engines.

All operations such as start and stop are monitored by a computer to make the aircraft move more smoothly and put less strain on the landing gear, as compared to prior art technique.

According to the invention, these and other objects and advantages are achieved in that the system, in the area where the aircraft is to park and be transported inward for accurate parking at a passenger loading device or the like, and outward to be able to taxi by means of its own engines, comprises a carriage which catches and locks at least one wheel of the aircraft, preferably the nose wheel, and which is drivable back and forth along a guide means arranged on or in the ground.

The invention will now be described in greater detail with reference to the accompanying drawings in which.

Figure 1:
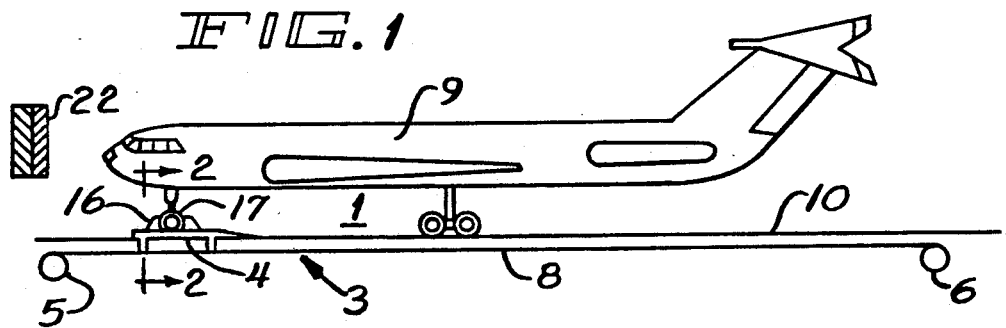
FIG. 1 is a schematic side view of an aircraft parked with its nose wheel parked and locked.
Figure 2:
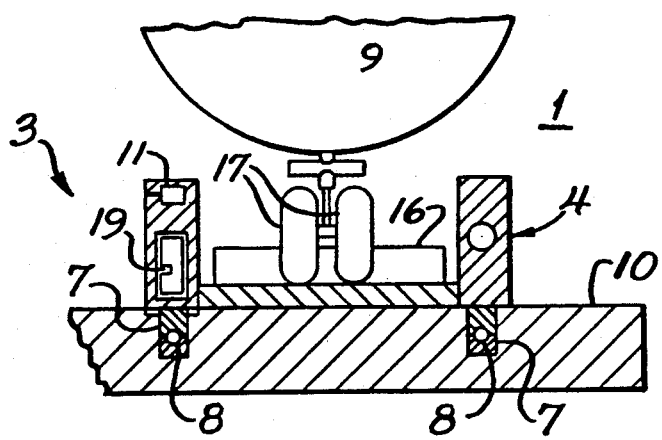
FIG. 2 is a cross-sectional view along line II—II in FIG. 1 and illustrates in more detail how the nose wheel is parked on the carriage and how towing ropes are attached to the carriage.

Each parking place 1 and passenger loading device 2 are provided with a system according to the invention, generally designated 3; FIGS. 1, 2 and 5. Since all systems according to the invention are identical in design and function, only one will be described in detail. It should be pointed out that the number of systems may vary from one airport building to another, that the system can be adapted and varied from building to building, and that the system can be used in some other place than adjacent an arrivals building. The system can also be used for so-called remote parking of the aircraft, and in positions where the aircraft must be backed out to be able to taxi.

According to the embodiment shown in the drawings, the system comprises a carriage 4 driven by a capstan 5, 6. The carriage 4 runs on guide means 7 and is driven back and forth via towing ropes 8 in the region of the parking place 1 for nose-in parking of the aircraft 9 laterally of the passenger loading device 2, FIG. 5.

Figure 3:
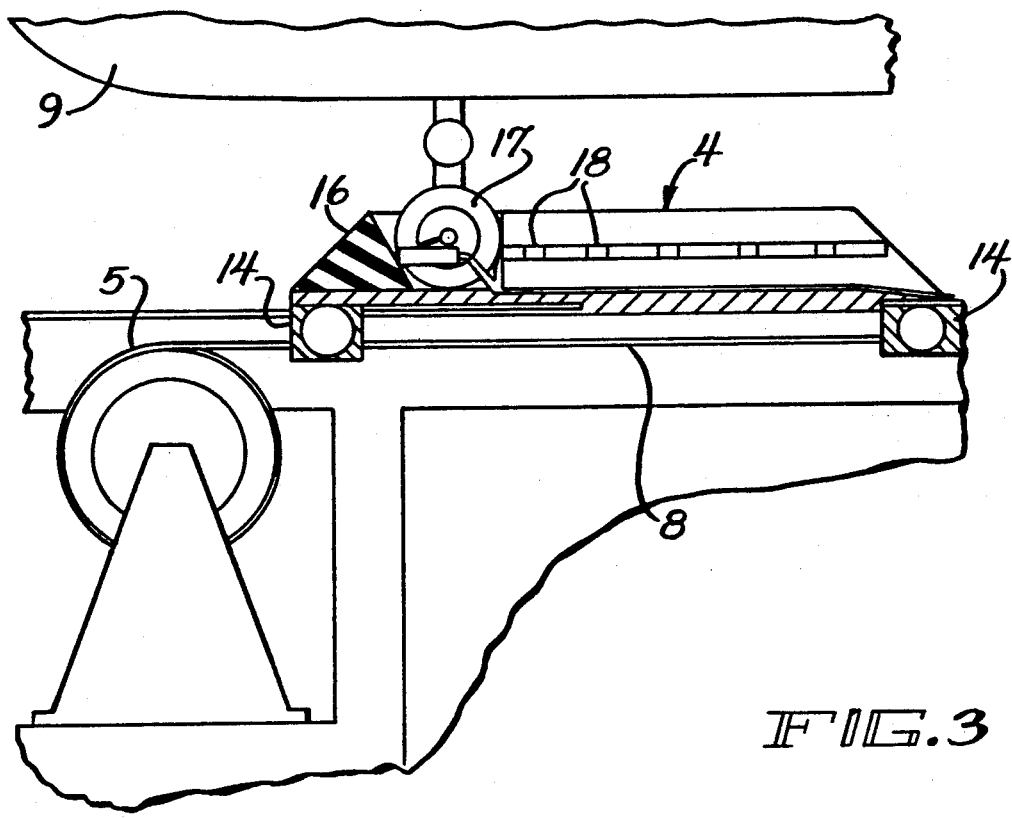
FIG. 3 is an enlarged schematic side view of the carriage as well as a towing rope, capstan, nose wheel, vertically adjustable locking means, aircraft, stop means in said guide means, and sensors mounted in the carriage.
Figure 4:
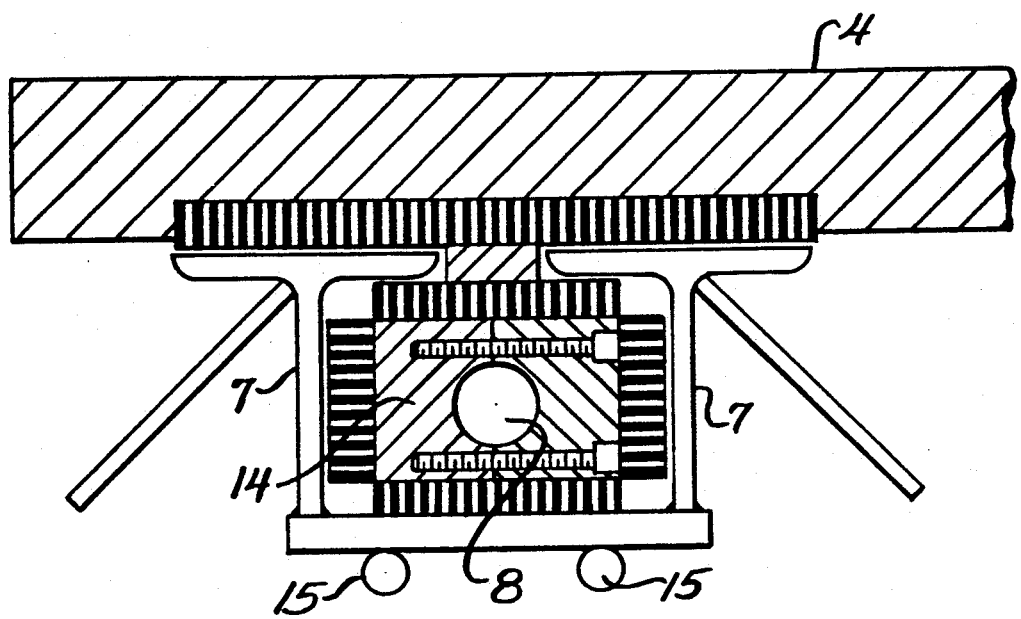
FIG. 4 is a schematic view of a guide means and the attachment of the carriage thereto.

The guide means 7, FIG. 4, are cast, flush with the ground 10, in the concrete or asphalt apron on which the aircraft 9 moves, and have the dimensions of, say, 50×1.5 m. The guide means 7 are cast in parallel with each other but need not extend in a straight line. They may also have a curved shape. Each end of the guide means, FIG. 1, is provided with a capstan 5, 6 between which the towing rope 8 runs. The towing rope 8 is protected by the guide means 7, FIG. 4, and is secured to stop means 14 in said guide means, FIGS. 3 and 4. To prevent ice formation in the guide means, they are provided with heating coils 15. The stop means 14 are connected to the carriage 4 which is provided with vertically adjustable locking means 16. The locking means serve to lock the nose wheel 17 of the aircraft 9 to the carriage 4.

In the two longitudinal sides of the carriage, there are installed a number of proximity sensors 18 which sense the nose wheel 17 of the aircraft 9 and transmit information to a steering computer 19 about the position of the nose wheel on the carriage and accordingly control the speed—stop and start sequences as well as the locking and releasing of the nose wheel. The capstans 5, 6 or, alternatively, only one capstan are in both alternatives provided with a so-called torque converter which provides for a smooth and even start and controls the pulling force so that impermissible stress does not occur on the nose wheel 17 of the aircraft 9.

The system 3 is operated from a portable wireless transmitter from which all operations of the system are performed. The portable transmitter transmits digital signals which cannot be confused with the neighbouring parking place 1 and transmits to one or more transceivers, one 11 of which is mounted on the carriage 4 and, for example, one adjacent the arrivals building 20 in connection with each parking place 1. From the carriage 4, signals for automatic control of the functions of the carriage are returned, for example the required speed of the carriage when connected to or disconnected from the wheel 14 of the aircraft 9, and the point of time when the locking means 16 are to lock or release.

The system according to the invention thus functions in the following way and as shown in FIGS. 5A-D. The aircraft 9 taxis into the gate in conventional manner, the pilots receiving a signal from a number of limit transducers 21. These are positioned transversely of the longitudinal direction of the aircraft 9 on the ground 10 along the area which will be passed by the aircraft. Alternatively, proximity limit transducers may be positioned on the front edge of the passenger loading device 2 facing the aircraft 9. When the aircraft has passed the limit transducers 21, the pilots obtain, via a sign 22, information on the distance up to the stopping point, and a stop signal when the aircraft is to stop.

All aircraft types stop with e.g. their nose wheel on the same stopping point, irrespective of the position of the door of the aircraft in relation to the passenger loading device 2. The limit transducers 21 indicate that the aircraft 9 has come to a stop, whereupon the carriage 4 is automatically connected to the aircraft nose wheel 17 and locks the locking means 16 to the nose wheel. The sensors 18 automatically control the speed of the carriage 4 and emits a signal for automatically locking the nose wheel 17 to the carriage 4 by means of the locking means 16.

Subsequently, the pilots in the aircraft 9 obtain information from the sign 22 that the brakes of the aircraft can be released. The carriage 4 then transports the aircraft automatically to a very accurate, predetermined stopping position in that the capstans 5, 6 pull the ropes 8 and measure the distance to the point where the aircraft 9 is to stop. The aircraft 9 is now safely parked and cannot change its position, even if subjected to external wind forces.

Figure 5A:
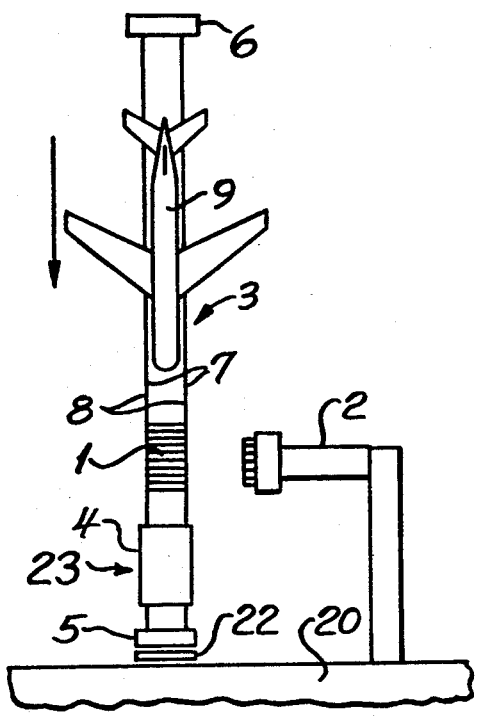
FIG. 5 shows four different schematic views of the function of the inventive system in a parking place (gate) adjacent an arrivals building with a passenger loading device of prior art design.
Figure 5B:
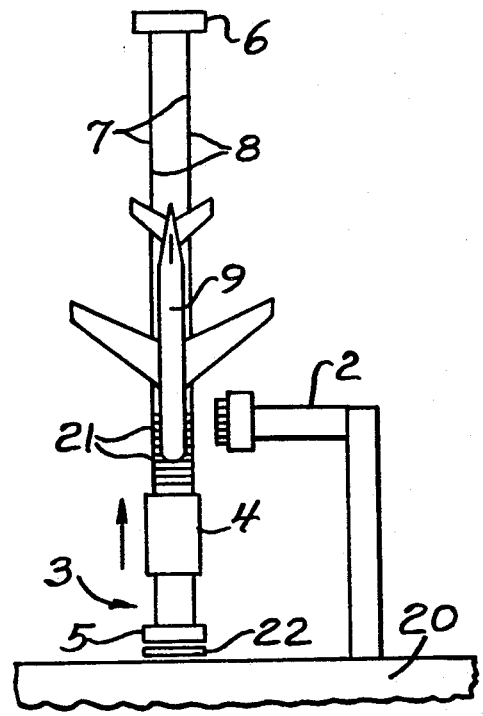
Figure 5C:
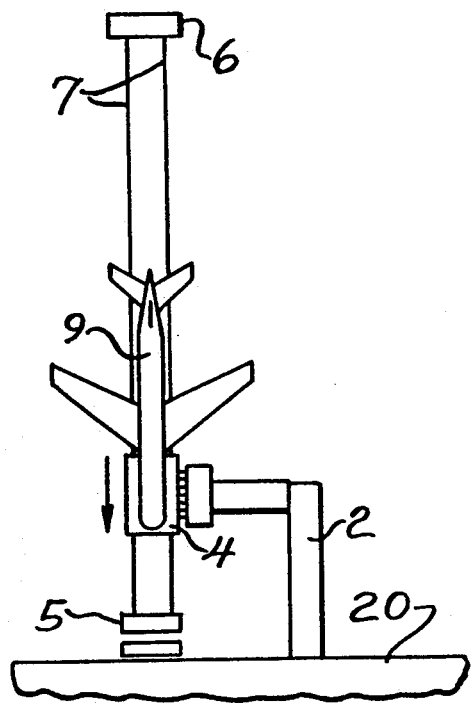
Figure 5D:
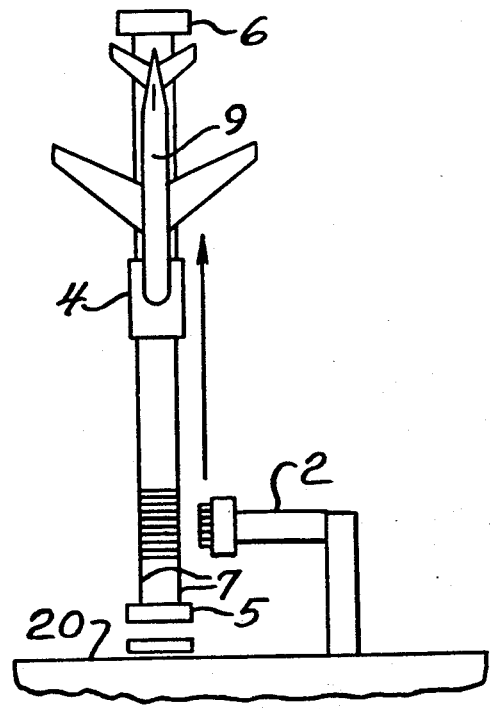

When the aircraft 9 has unloaded and loaded new passengers, has been refueled and catered and is ready for take off, someone in the ground personnel initiates the system 3 via the radio transmitter, whereupon the aircraft is automatically transported away from its parking position adjacent the arrivals building 20 in that the capstans 5, 6 pull the rope(s) 8 until the aircraft has automatically reached its final position and is free from obstacles outside the passenger loading device 2, see FIG. 5D.

When the aircraft 9 has come to a stop, the vertically adjustable locking means 16 are released. The carriage 4 is retarded in that the capstan 5 pulls the line 8 and moves the carriage which automatically returns to its parking position 23, see FIG. 5A.

Two towing ropes 8 are not necessarily required for moving the carriage 4, but a single line can be sufficient, depending on the design of the arrivals building and which aircraft type is to be served.

It should also be emphasised that the system according to the invention can most conveniently also be used for transportation of aircraft in extremely narrow spaces in which an aircraft normally does not taxi by means of its own engines. Further, it may be possible to build smaller arrivals buildings, since the shortest distance between two aircrafts parked in parallel with each other, stipulated by the ICAO, must be 7.5 m. This distance, 7.5 m, is required inter alia to facilitate safe fighting of a fire in an aircraft and to prevent the fire from spreading to aircraft parked close by.

In case of fire in an aircraft, the system according to the invention can, however, automatically transport the aircraft away from the gate and thus avert the risk of spreading of the fire to neighbouring buildings and aircraft parked close by.

The invention can possibly contribute to a reduction of the distance between the wings of the aircraft and thus a reduction of the size of the arrivals building.

In the shown and described embodiment of the system 3 according to the invention, the driving means for the carriage 4 consists of one or more capstans 5, 6.

As an alternative to capstans, drives such as rack and pinion drives, ball screw drives, pneumatic and/or hydraulic drives etc are also conceivable. It would even be possible to mount one or more drives, for example electric motors or internal combustion engines, directly on the carriage for driving the driving wheels thereof.

Figure 6:
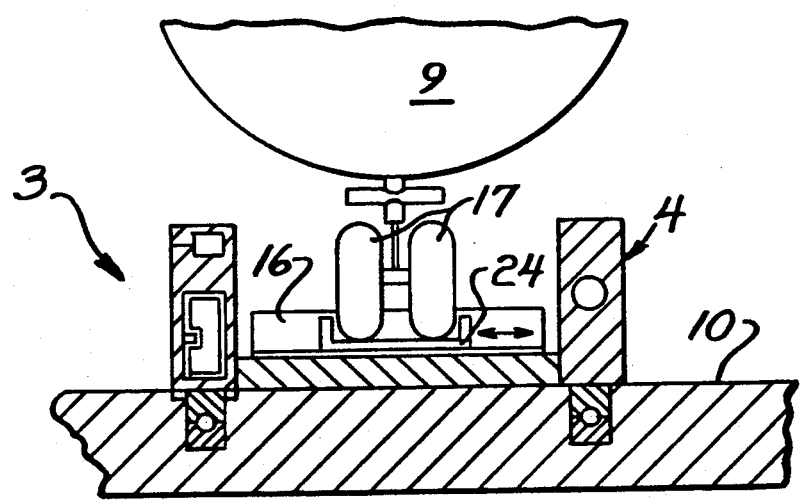
FIG. 6 is a cross-sectional view corresponding to that shown in FIG. 2, of a variant of how the nose wheel is parked on the carriage.

It sometimes happens that the aircraft 9, when transported from its parking position adjacent the arrivals building 20, does not move straight backward but begins to deviate in one or the other direction, before reaching its final position so as to taxi under its own power. To counteract and compensate for such deviation, the carriage 4 is, as shown in FIG. 6, provided with a small sled 24. The sled is positively actuated by some suitable means substantially perpendicular (see the double arrow) to the direction of motion of the carriage 4 and supports the nose wheel 17 of the aircraft 9. When during backing the aircraft begins to deviate in either direction, the sled 24 is displaced in lateral direction such that the aircraft is straighened to move substantially straight backward. The sled 24 can be operated automatically and/or via control signals from the portable transmitter.

I claim:

1. A system for automatic ground transportation of an aircraft, comprising:
    a carriage connectable to a nose wheel of an aircraft,
    locking means arranged and constructed to lock the nose wheel to said carriage,
    guide means disposed at ground level,
    said carriage being drivable along said guide means,
    a small sled disposed on said carriage, said sled being movable in a direction substantially perpendicular to carriage motion,
    said sled supporting a nose wheel of the aircraft, and being laterally displaceable upon lateral deviation of the aircraft during backing movement,
    said system arranged and constructed to automatically align the aircraft to allow substantially straight backward movement, whereby the accurate, reliable, and efficient transportation of aircraft to and from a parking position is facilitated.

2. A system for automatic ground transportation of an aircraft according to claim 1, wherein said locking means comprises vertically adjustable locking means disposed on said carriage, said locking means arranged and constructed to lock a nose wheel to said carriage.

3. A system for automatic ground transportation of an aircraft according to claim 2, wherein said guide means comprises at least one guide means element secured to the ground.

4. A system for automatic ground transportation of an aircraft according to claim 3, further comprising a capstan, said capstan arranged and constructed to drive said carriage fore and aft.

* * * * *